US007325816B2

(12) United States Patent
Johnson

(10) Patent No.: US 7,325,816 B2
(45) Date of Patent: Feb. 5, 2008

(54) MOTORCYCLE DOLLY

(76) Inventor: Charles Richard Johnson, 257 Aurora-Hudson Rd., Aurora, OH (US) 44202

( * ) Notice: Subject to any disclaimer, the term of this patent is extended or adjusted under 35 U.S.C. 154(b) by 213 days.

(21) Appl. No.: 11/147,939

(22) Filed: Jun. 8, 2005

(65) Prior Publication Data
US 2005/0284826 A1    Dec. 29, 2005

Related U.S. Application Data

(60) Provisional application No. 60/577,866, filed on Jun. 8, 2004.

(51) Int. Cl.
*B62H 3/04* (2006.01)
(52) U.S. Cl. .................. 280/79.4; 280/79.11; 280/79.7; 211/20; 211/24
(58) Field of Classification Search .................. 280/2, 280/79.11, 79.4, 79.7; 414/426–430; 211/20, 211/24
See application file for complete search history.

(56) References Cited

U.S. PATENT DOCUMENTS

| 770,436 | A | | 9/1904 | Mansfield |
|---|---|---|---|---|
| 772,014 | A | | 10/1904 | Weber |
| RE12,430 | E | | 1/1906 | Weber |
| 834,146 | A | | 10/1906 | Lewis |
| 1,230,326 | A | | 6/1917 | Puderbaugh |
| 2,252,534 | A | * | 8/1941 | Trotter ........................ 414/428 |
| 2,573,728 | A | * | 11/1951 | Pugh, Sr. .................... 414/430 |
| 2,610,750 | A | * | 9/1952 | Hulbert ...................... 414/430 |
| 5,249,907 | A | * | 10/1993 | Poten et al. ................. 414/430 |
| 5,609,461 | A | * | 3/1997 | Lichtenberg ................ 414/426 |
| 5,732,960 | A | | 3/1998 | Elam |
| 5,735,410 | A | * | 4/1998 | Kallstrom .................... 211/20 |
| 5,984,339 | A | * | 11/1999 | Guild ......................... 280/402 |
| 5,988,402 | A | * | 11/1999 | Mayfield ..................... 211/20 |
| 6,095,746 | A | | 8/2000 | Bergin |
| 6,287,069 | B1 | * | 9/2001 | Oliphant et al. ............ 414/426 |

* cited by examiner

*Primary Examiner*—Christopher P. Ellis
*Assistant Examiner*—Katy Meyer
(74) *Attorney, Agent, or Firm*—Martin & Ferraro, LLP

(57) ABSTRACT

A motorcycle dolly is provided for supporting a front wheel or rear wheel of a motorcycle or other similar two-wheel vehicle on a work surface. The motorcycle dolly includes a frame, a wheel support platform carried by the frame, a plurality of casters attached to the frame, and a first clamping member and a second clamping member pivotably attached to the frame. The wheel support platform selectively receives either the front wheel or rear wheel thereon, and the plurality of casters support the motorcycle dolly for movement on the work surface. The first clamping member and second clamping member can be selectively pivoted with respect to one another to clamp either the front wheel or rear wheel therebetween. As such, when either the front wheel or rear wheel is securely retained between the first clamping member and second clamping member on the motorcycle dolly, the motorcycle can be repositioned using the motorcycle dolly.

20 Claims, 5 Drawing Sheets

MOTORCYCLE DOLLY

CROSS REFERENCE TO RELATED APPLICATION

This application claims the benefit of U.S. Provisional Application Ser. No. 60/577,866, filed on Jun. 8, 2004.

TECHNICAL FIELD

The present invention relates a motorcycle dolly for supporting either the front wheel or rear wheel of a motorcycle. More particularly, the present invention relates to a motorcycle dolly having a first clamping member and a second clamping member adjustable with respect to one another to retain a motorcycle wheel in position on the motorcycle dolly. More specifically, the present invention relates to a motorcycle dolly having a pivotably adjustable first clamping member, a pivotably adjustable second clamping member, and a wheel support platform, the first clamping member and second clamping member being adjustable to clamp a motorcycle wheel in position on the wheel support platform.

BACKGROUND ART

Motorcycles and other two-wheeled vehicles are difficult to store. For example, motorcycles are inherently unstable, and tend to tip in direction opposite the plane in which their wheels rotate. When in use, a rider must maintain his or her balance to keep a motorcycle in a substantially upright position, and prevent the motorcycle from tipping. When not in use, the motorcycle is normally propped up using a kick-stand. The kick-stand prevents the motorcycle from tipping by maintaining the motorcycle in a partially-upright inclined position. However, the motorcycle fills more side-to-side space when in the partially-upright inclined position afforded by the kick-stand. The additional side-to-side space required when using the kick-stand can pose a problem when storing a motorcycle. Moreover, placement of the kick-stand on either the left-hand or right-hand side of the motorcycle dictates where the motorcycle can be stored. For example, if the kick-stand was mounted on the rider's left-hand side, then the motorcycle would lean to the rider's left when propped up using the kick-stand. Furthermore, if the kick-stand was mounted on the rider's right-hand side, then the motorcycle would lean to the rider's right when propped up using the kick-stand. Either way, whether the kick-stand was positioned on the left-hand or right-hand side of the motorcycle, it would be difficult to park the motorcycle against a wall of a garage.

When parked against a garage wall, access to the motorcycle would be constrained because the motorcycle would ultimately lean either toward or away from the wall (depending on the placement of the kick-stand). To maximize the already constrained access, the motorcycle would ideally be positioned such that it would lean away from the garage wall. Therefore, if the kick-stand were positioned on the rider's left-hand side, the motorcycle would ideally be parked along the right side wall (when facing toward the rear wall of the garage), and if the kick-stand were positioned on the rider's right-hand side, the motorcycle would ideally be parked along the left side wall (when facing toward the rear wall of the garage). In some garages, such positioning is not possible, and the motorcycle must be parked near the center of the garage.

In addition to being difficult to store, a motorcycle can be difficult to move around. The turning radius of the motorcycle, while ideal for driving conditions, is not suited to allow for repositioning of the motorcycle in a tight space. For example, if a motorcycle is driven into a garage forwards, then it can be difficult to turn the motorcycle around in a garage. The tight space of most garages will not afford the space necessary for the motorcycle to make a complete turn. Instead, the motorcycle must be moved back and forth in arcuate paths until the motorcycle is effectively turned around. Such back and forth movement requires space which may not be available in a garage. As such, a motorcycle or other similar two-wheeled vehicle is difficult to store, and requires space for repositioning which may not be available in the place it is stored.

Consequently, there is a need for a device which can support a motorcycle or other similar two-wheeled vehicle in an upright position, and can provide for the repositioning of the motorcycle or other similar two-wheeled vehicle in tight spaces.

DISCLOSURE OF INVENTION

In general, the present invention contemplates a motorcycle dolly for supporting a front wheel or rear wheel of a motorcycle or other similar two-wheel vehicle on a work surface, the motorcycle dolly having a frame, a wheel support platform carried by the frame for selectively receiving the front wheel or rear wheel thereon, a plurality of casters attached to the frame for supporting the motorcycle dolly, and a first clamping member and a second clamping member pivotably attached to the frame, wherein, when either the front wheel or rear wheel is positioned on the wheel support platform between the first clamping member and second clamping member, the first clamping member and second clamping member can be selectively pivoted with respect to one another to clamp either the front wheel or rear wheel therebetween.

Further embodiments, variations, and enhancements are also described herein.

BEST MODE FOR CARRYING OUT THE INVENTION

Figure 1:
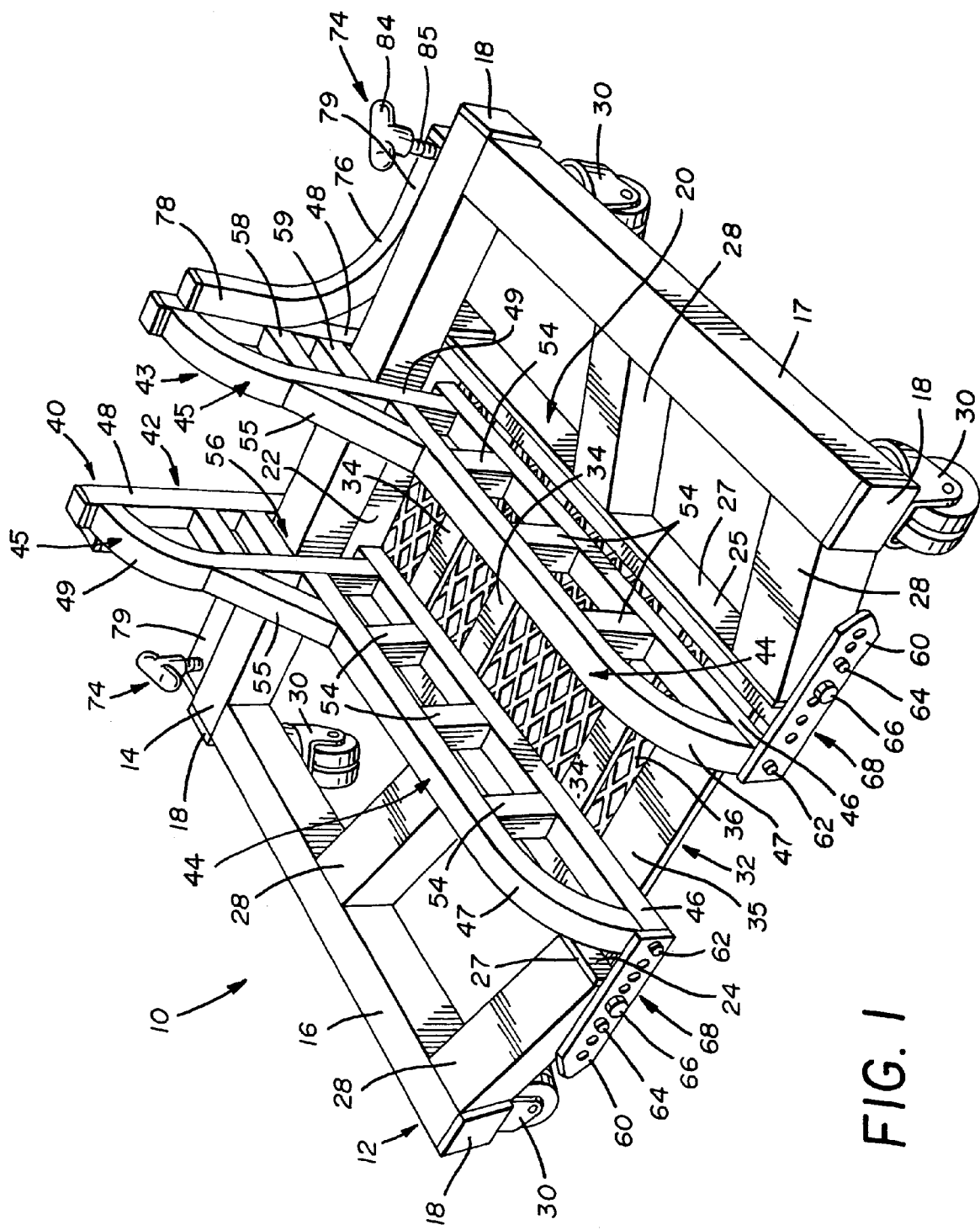
FIG. 1 is a perspective view of a motorcycle dolly from the rear.

A motorcycle dolly according to the present invention is generally indicated by the numeral 10 in FIGS. 1-5, and is configured to retain either the front wheel or rear wheel of a motorcycle thereon. The motorcycle dolly 10 is ultimately positioned on the surface of a floor, and includes a frame 12 which can be U-shaped. The frame 12 is formed by a connecting member 14 which spaces a first leg member 16 and a second leg member 17. The connecting member 14, the first leg member 16 and second leg member 17 can be formed from tubular stock material having a square cross-section. As seen in FIGS. 1-4, end caps 18 (ideally constructed of polymeric material) are sized to match the inner cross-sectional dimensions of the connecting member 14, the first leg member 16 and second leg member 17, and are provided to cover the open ends thereof.

The first leg member 16 and second leg member 17 are substantially parallel to one another, and define a space therebetween for accommodating a subframe generally indicated by the number 20. As seen in FIG. 1, the subframe 20 can be U-shaped, and includes a base member 22 which spaces a first arm member 24 and a second arm member 25. The first arm member 24 and second arm member 25 have substantially L-shaped cross sections formed from horizontal members 26 and vertical members 27 which are perpendicularly oriented with respect to one another.

Figure 5:
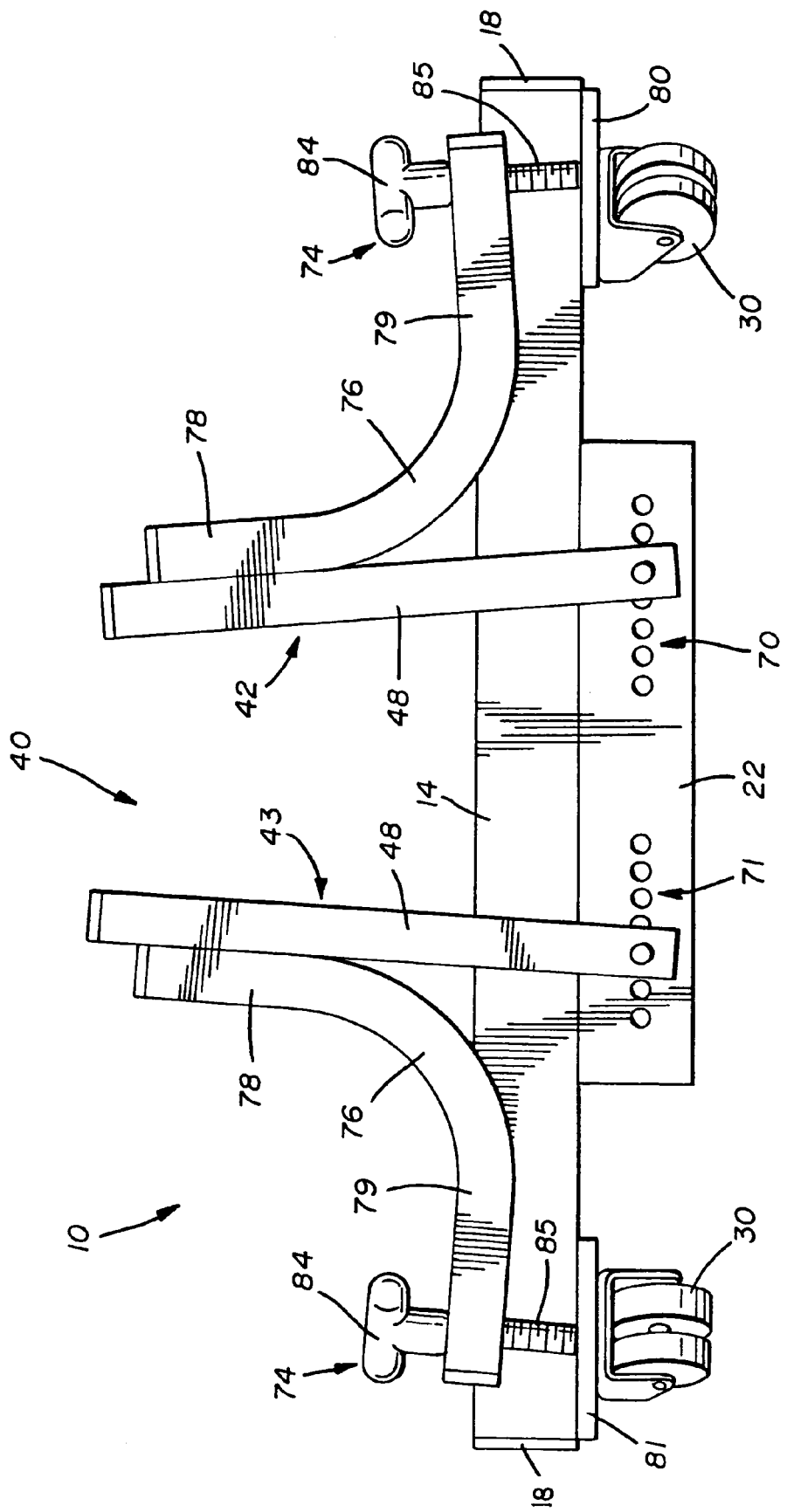
FIG. 5 is a front elevational view of the motorcycle dolly.

To support the subframe 20 relative to the frame 12, the base member 22, as seen in FIG. 5, is welded underneath the connecting member 14. The subframe 20 is further supported relative to the frame 12 by inclined struts 28. As seen best in FIG. 1, the inclined struts 28 are provided between the first leg member 16 and vertical member 27 of the first arm member 24, and between the second leg member 17 and vertical member 27 of the second arm member 25.

The angle of the struts 28 is provided to facilitate positioning of the horizontal members 26 of the first arm member 24 and second arm member 25 close to the surface of the floor, while simultaneously providing the vertical distance necessary to accommodate casters 30 attached to the frame 12. As seen best in FIG. 1, the casters 30 are provided on the corners of the motorcycle dolly 10. That is the casters 30 are provided at either end of the connecting member 14, and also provided on the first leg member 16 and second leg member 17 adjacent the ends thereof opposite the connecting member 14. The casters provide for the mobility of the motorcycle dolly 10, and can be welded or mechanically fastened in position.

Extending between the first arm member 24 and second arm member 25, and supported by the horizontal members 26 thereof, is a wheel support platform 32. The wheel support platform 32 includes a plurality of spaced support slats 34 and a receiving slat 35 extending between the first arm member 24 and second arm member 25. To support the wheel support platform 32, the support slats 34 and receiving slat 35 can be welded to the top surfaces, bottom surfaces, or ends of the horizontal members 26. However, as seen in FIGS. 1 and 2, the support slats 34 are ideally welded to the ends of the horizontal members 26, and the receiving slat 35 is ideally welded to the bottom surfaces of the horizontal members 26.

Figure 2:
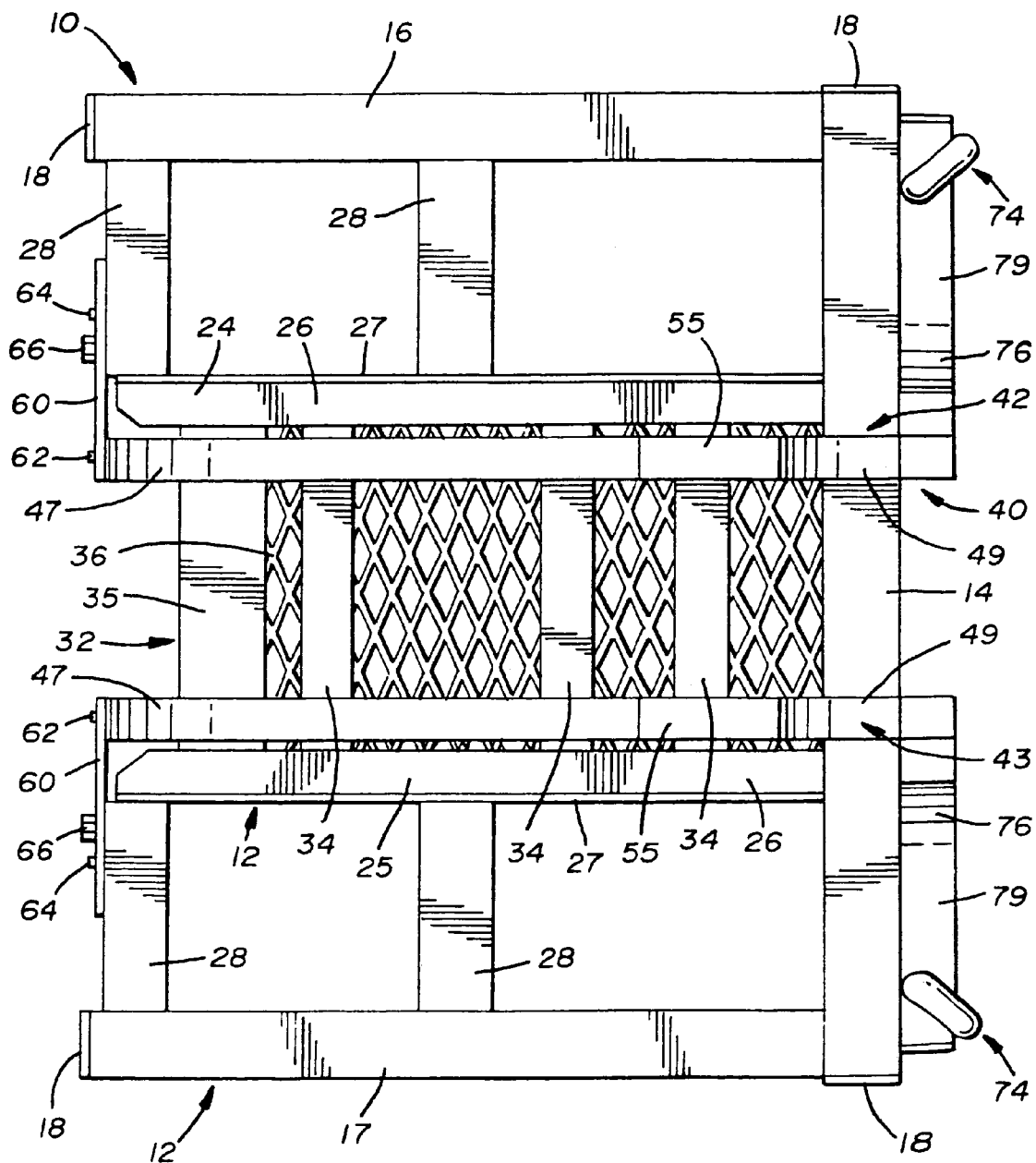
FIG. 2 is a top plan view of the motorcycle dolly.

As seen in FIGS. 1 and 2, a grid plate 36 is used to fill the gaps between the support slats 34 and receiving slat 35. In the configuration of the wheel support platform 32 described above, a grid plate 36 ideally forms the remainder of the wheel support platform 32. The grid plate 36 is attached to the bottom of the support slats 34 and to the edge of the receiving slat 35. Furthermore, because the support slats 34 are attached to the ends of the horizontal members 26, the grid plate 36 can also be attached to the bottom surfaces of the horizontal members 26. In alternative configurations, multiple pieces of grid plate 36 can be used, and these multiple pieces can be attached between the support slats 34 and receiving slat 35 to complete the wheel support platform 32. However, in any of the possible configurations, the wheel support platform 32 must support the weight of the front end or rear end of the motorcycle.

As seen best in FIG. 1, the receiving slat 35 is positioned such that, as either the front wheel or rear wheel of a motorcycle is received on the wheel support platform 32, the motorcycle dolly 10 does not tip upwards. As such, the receiving slat 35 is positioned behind the casters 30 provided on the ends of the first leg member 16 and second leg member 17. The proximity of the receiving slat 35 to the center of gravity of the motorcycle dolly 10 inhibits tipping thereof, or, in other words, limits the tendency of the motorcycle dolly 10 to tip when the front wheel or rear wheel of a motorcycle is received thereon.

To retain the front wheel or rear wheel of a motorcycle in position on the wheel support platform 32, a clamping mechanism generally indicated by the numeral 40 is provided. The clamping mechanism 40 includes a first clamping member 42 and a second clamping member 43 which are pivotally attached to the remainder of the motorcycle dolly 10, and are adjustable inwardly and outwardly with respect to one another. The first clamping member 42 and second clamping member 43 are mirror images of one another, and can be formed from square cross-sectioned tubing.

The first clamping member 42 and second clamping member 43 can be L-shaped, and can each include a horizontal portion 44 and a vertical portion 45. The horizontal portion 44 includes a horizontally-oriented straight rail 46 and a horizontally-oriented J-shaped rail 47, and the vertical portion 45 includes a vertically-oriented straight rail 48 and a vertically-oriented J-shaped rail 49. As best seen in FIG. 1, the horizontally-oriented straight rail 46 and the horizontally-oriented J-shaped rail 47 extend in parallel over most of their lengths. The horizontally-oriented straight rail 46 and the horizontally-oriented J-shaped rail 47 are attached to one another at one of their ends, and are attached to the vertically-oriented J-shaped rail 49 at the other of their ends. As seen in FIG. 1, the horizontally-oriented straight rail 46 and the horizontally-oriented J-shaped rail 47 are spaced along a majority of their lengths by a plurality of support rails 54 which reinforce the connection between the horizontally-oriented straight rail 46 and horizontally-oriented J-shaped rail 47. Furthermore, the horizontally-oriented J-shaped rail 47 is braced relative to the vertically-oriented J-shaped rail 49 by an inclined rail 55.

Figure 3:
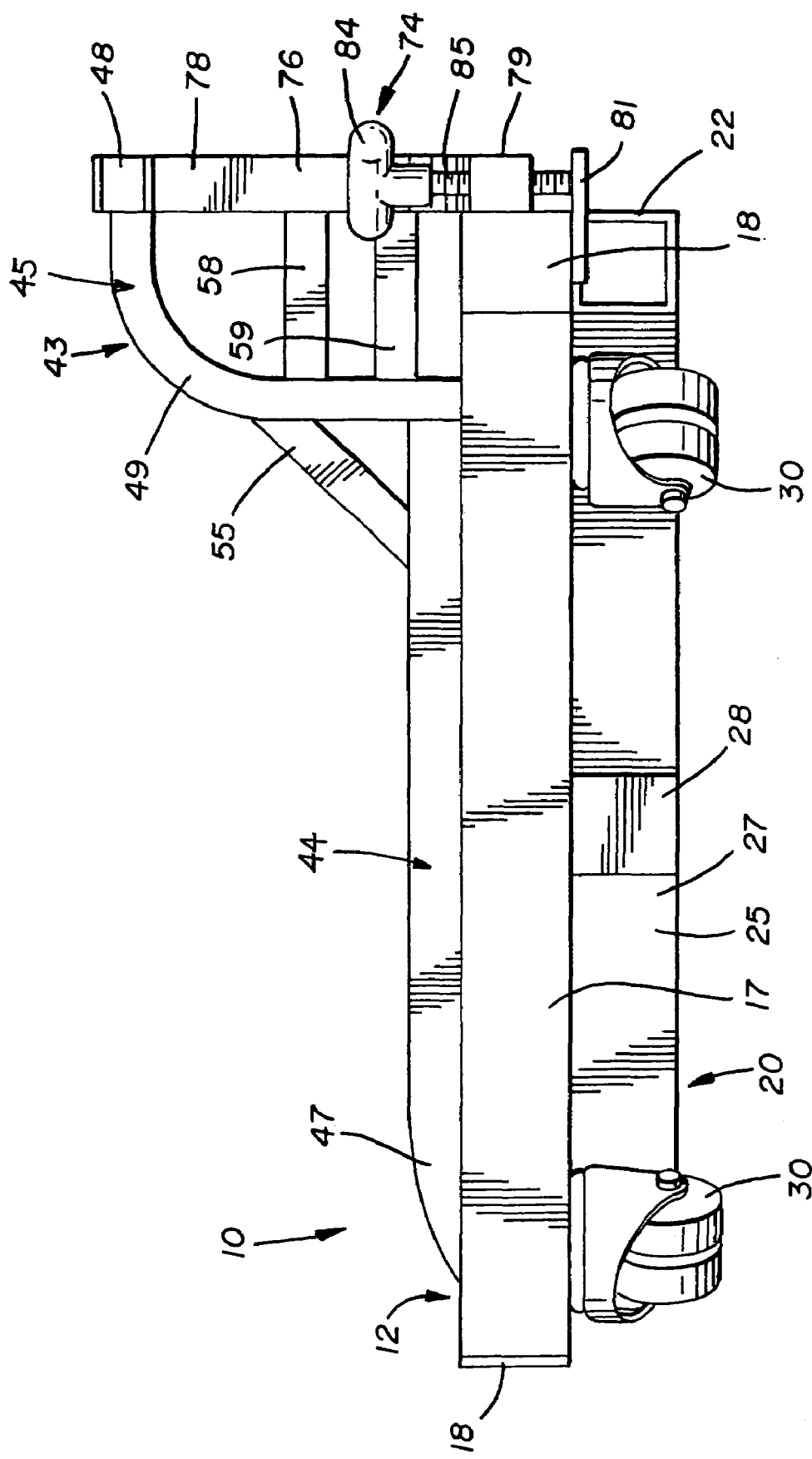
FIG. 3 is a side elevational view of the motorcycle dolly.

As best seen in FIG. 1, the vertically-oriented straight rail 48 and vertically-oriented J-shaped rail 49 also extend in parallel over most of their lengths. The vertically-oriented straight rail 48 and vertically-oriented J-shaped rail 49 are attached to one another proximate one of their ends, and at the other of their ends, form a gap generally indicated by the numeral 56. As seen best in FIG. 3, the vertically-oriented straight rail 48 and the vertically-oriented J-shaped rail 49 are spaced by an upper support rail 58 and a lower support rail 59 which reinforce the connection between the vertically-oriented straight rail 48 and the vertically-oriented J-shaped rail 49. As seen in FIG. 3, the lower support rail 59 defines the upper extremity of the gap 56.

The gap 56 accommodates placement of the connecting member 14 and a portion of the base member 22 therein, and, because both the first clamping member 42 and second clamping member 43 are pinned to the base member 22, allows the first clamping member 42 and second clamping member 43 freedom to pivot. Bracket plates 60 are provided proximate the attachment of the horizontally-oriented straight rails 46 and horizontally-oriented J-shaped rails 47 to one another on both the first clamping member 42 and second clamping member 43.

The bracket plates 60 include pins 62 which extend therethrough and outwardly therefrom. The pins 62 provide for the movement of the first clamping member 42 and second clamping member 43 by extending through the horizontally-oriented straight rails 46 and base member 22 when the motorcycle dolly 10 is assembled. As such, the first clamping member 42 and second clamping member 43 are attached to the motorcycle dolly 10 but are capable of pivoting relative to the bracket plate 60 and base member 22 to which they are pinned.

For example, the horizontally oriented straight rails 46 include apertured end caps (not shown) adapted to receive the pins 62. When received in the apertures of the apertured end caps, the pins 62 extend through the interior of the horizontally-oriented straight rails 46. Upon exiting the horizontally-oriented straight rails 46, the pins are received in apertures provided through the base member 22, and are ultimately received in apertures provided in the vertically-oriented straight rails 48 adjacent their lower extremities.

Figure 4:
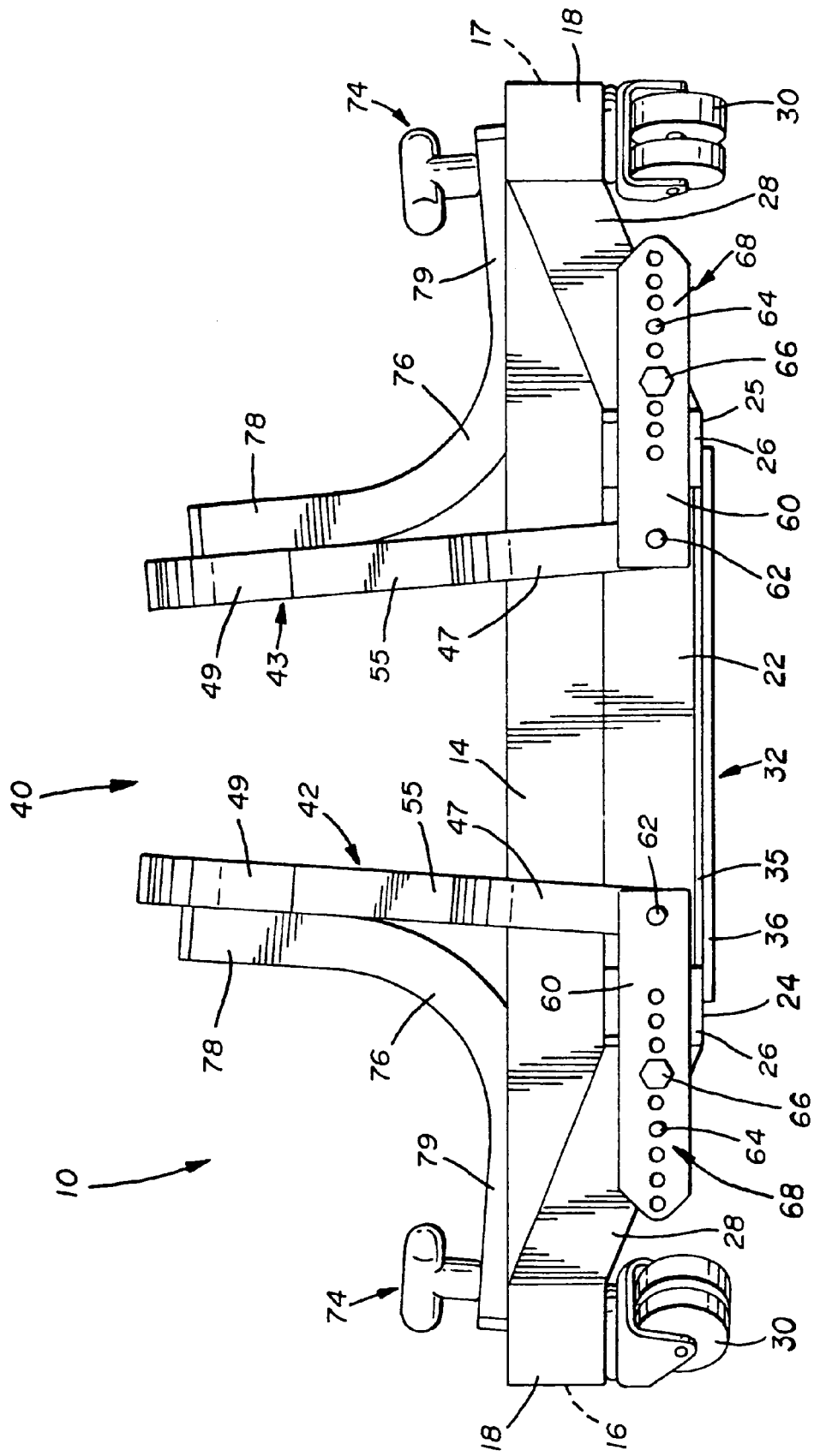
FIG. 4 is a rear elevational view of the motorcycle dolly.

As seen best in FIG. 4, the bracket plates 60 are removably attached to the inclined struts 28 provided adjacent both the first arm member 24 and second arm member 25. These inclined struts 28 are each provided with pins 64 extending outwardly therefrom, and apertures (not shown) adapted to accommodate mechanical fasteners 66. Additionally, the bracket plates 60 are each provided with aperture sets 68.

To attach each bracket plate 60 to their respective inclined strut 28, the mechanical fasteners 66 are inserted into one of the apertures of the associated aperture sets 68. Thereafter, the mechanical fasteners 66 are inserted into the corresponding aperture provided on each of the inclined struts 28. To stabilize the connection of the bracket plates 60 to the inclined struts 28, the pins 64 are inserted into another one of the apertures of the associated aperture set 68.

Use of the aperture sets 68 allows the bracket plates 60, and therefore, the first clamping member 42 and second clamping member 43 to be repositioned relative to one another. For example, different apertures of the aperture sets 68 can be used to accommodate the pins 64 and mechanical fasteners 66. Consequently, the relative spacing of the first clamping member 42 and second clamping member 43 can be adjusted by varying the placement of the pins 64 and mechanical fasteners 66 in the apertures of the aperture sets 68.

Complimenting the aperture sets 68 are a first aperture set 70 and a second aperture set 71 provided through the base member 22. As discussed above, the pins 62 are inserted into apertures provided through the base member 22. Use of the first aperture set 70 and second aperture set 71 allows the pins 62 to be selectively positioned in the apertures thereof. Therefore, the spacing between the first clamping member 42 and second clamping member 43 can be matched on either end of the motorcycle dolly 10. Moreover, the use of the first aperture set 70, the second aperture set 71, and the aperture sets 68 allows for the inward and outward movement of the first clamping member 42 and second clamping member 43 relative to one another. As such, the first clamping member 42 and second clamping member 43 can be spaced to accommodate different sizes of motorcycle wheels.

With the use of tilt adjusters 74, the angles of the first clamping member 42 and second clamping member 43 with relative to horizontal can also be adjusted. For example, attached to both the first clamping member 42 and second clamping member 43 are brackets 76. The brackets 76 can be curved, and, as such, can include vertical runs 78 and horizontal runs 79. The vertical runs 78 are attached to the vertically-oriented straight rails 48 of both the first clamping member 42 and second clamping member 43. Moreover, the horizontal runs 79 are provided adjacent a first lip 80 and a second lip 81. The first lip 80 and second lip 81 both extend outwardly from the connecting member 14 in a direction opposite the first leg member 16 and second leg member 17.

The tilt adjusters 74 are inserted through apertures (not shown) provided through the ends of the horizontal runs 79. The tilt adjusters 74, as seen in FIG. 5, ultimately contact the first lip 80 and second lip 81 to limit the pivotal movement of the first clamping member 42 and second clamping member 43. Moreover, adjustment of the tilt adjusters 74 inwardly and outwardly with respect to the horizontal runs 79 serves to readjust the angles of the first clamping member 42 and second clamping member 43 relative to horizontal.

The tilt adjusters 74 include knob sections 84 and threaded sections 85 (which extend through the horizontal runs 79). When the knob sections 84 are twisted, the threaded sections 85, depending on the direction of rotation of the knob sections 84, are twisted into and out of the horizontal runs 79. If, as seen in FIG. 5, the threaded sections 85 are twisted all the way into the apertures provided through the horizontal runs 79, then the maximum angles of the first clamping member 42 and second clamping member 43 relative to horizontal are achieved. The contact of the threaded sections 85 with the first lip 80 and second lip 81 force the first clamping member 42 and second clamping member 43 into such positions. Thereafter, the angles of the first clamping member 42 and second clamping member 43 relative to horizontal can be decreased by twisting the knob section 74 such that the threaded sections 85 are twisted out of the horizontal runs 79. As such, the more the threaded sections 85 are twisted out of the horizontal runs 79, the smaller the angles of the first clamping members 42 and second clamping members 43 become relative to horizontal.

Consequently, given the ability to readjust the spacing of the first clamping member 42 and second clamping member 43 with respect to one another, and the pivotal movement afforded by the first clamping member 42 and second clamping member 43, different sizes of motorcycle wheels can be securely retained by the motorcycle dolly 10.

For example, to facilitate use of the motorcycle dolly 10, the width of one of the wheels of the motorcycle to be supported by the motorcycle dolly 10 is initially measured. Thereafter, the measurement is used, if necessary, to adjust the spacing between the first clamping member 42 and second clamping member 43. For example, if the measurement is larger or smaller than the current spacing of the first clamping member 42 and second clamping member 43, then both of the mechanical fasteners 66 used to secure each bracket plate 60 to the motorcycle dolly 10 are removed.

Once the mechanical fasteners 66 are removed, the bracket plates 60 (including aperture sets 68) can be repositioned relative to the pins 64, and the pins 62 can be adjusted relative to the first aperture set 70 and second aperture set 71. Repositioning of the bracket plates 60 relative to the pins 64, and adjustment of the pins 62 relative to the first aperture set 70 and second aperture set 71 allows the spacing between the first clamping member 42 and second clamping member 43 to be changed. For example, after the fasteners 66 have been removed, the bracket plates 60 have been separated from the pins 64, and the pins 62 have been removed from the apertures provided on the lower extremities of the vertically-oriented straight rails 48 and from the apertures of the first aperture set 70 and second aperture set 71, it is possible to adjust the spacing between the first clamping member 42 and second clamping member 43.

When the first clamping member 42 and second clamping member 43 are properly spaced according to the width of the measured motorcycle wheel, the pins 62 can be inserted in the apertures of the first aperture set 70 and second aperture set 71 which approximate that width. Afterwards, the pins 62 are inserted into the apertures provided on the lower extremities of the vertically-oriented straight rails 48, and the pins 64 are inserted into apertures of the aperture sets 68 which also approximate the width of the measured motorcycle wheel. Once the first clamping member 42 and second clamping member 43 are properly spaced, the mechanical fasteners 66 can be used to fasten the bracket plates 60 to the inclined struts 28 to maintain that spacing.

To position the motorcycle on the motorcycle dolly 10, the motorcycle wheel, for which the spacing between the first clamping member 42 and second clamping member 43 has been adjusted, is rolled onto the wheel support platform 32. When on the wheel support platform 32, the motorcycle wheel is preferably positioned to abut the connecting member 14. Thereafter, the tilt adjusters 74 are twisted to reorient the angular positions of the first clamping member 42 and second clamping member 43 toward the motorcycle wheel positioned on the wheel support platform 32. The pivotal movement of the first clamping member 42 and second clamping member 43 (afforded by the twisting of the tilt adjusters 74) serves to clamp the motorcycle wheel therebetween.

In conclusion, when the wheel is securely retained between the first clamping member 42 and second clamping member 43 on the motorcycle dolly 10, the motorcycle can be repositioned. The mobility provided by the casters 30 of the motorcycle dolly 10 affords the motorcycle a greater turning radius, and allows the motorcycle to be turned around in a relatively confined space such as a garage. For example, when using the motorcycle dolly 10, either the front wheel or rear wheel will be driven onto the wheel support platform 32. Once on the wheel support platform 32, the front wheel or rear wheel will be positioned between the first clamping member 42 and second clamping member 43. The first clamping member 42 and second clamping member 43 can then be pivoted using the tilt adjusters 74 to clamp the wheel positioned therebetween on the motorcycle dolly 10, and support the motorcycle in an upright position. Thereafter, the motorcycle can be repositioned on the work surface by pivotal movement about the unsupported wheel. That is, like the movement of the hands of a clock, the motorcycle can be pivoted about the unsupported wheel when using the motorcycle dolly 10. As such, the motorcycle dolly 10 allows for repositioning of the motorcycle in a relatively tight space.

While in accordance with the Patent Statutes, only the best mode and preferred embodiment has been presented and described in detail, it is to be understood that the invention is not limited thereto or thereby.

The invention claimed is:

1. A motorcycle dolly for supporting either a front wheel or a rear wheel of a motorcycle or other similar two-wheeled vehicle on a work surface, the motorcycle dolly comprising:
   a frame having a connecting member joining a first leg member and a second leg member, said first leg member and said second leg member defining a space therebetween;
   a wheel support platform carried by said frame for selectively receiving one of the front wheel and the rear wheel thereon;
   a plurality of casters attached to said frame for supporting the motorcycle dolly;
   a first clamping member and a second clamping member pivotably attached relative to said frame, said first clamping member and said second clamping member each having a first portion extending upwardly and a second portion aligned with at least one of said first leg member and said second leg member, said first portion and said second portion disposed at an angle relative to one another, wherein, when either the front wheel or the rear wheel is positioned on said wheel support platform between said first clamping member and said second clamping member, said first clamping member and said second clamping member can be selectively pivoted with respect to one another to clamp either the front wheel or the rear wheel therebetween by positioning said first portions of both said first clamping member and said second clamping member in substantial contact with either the front wheel or the rear wheel;
   a subframe having a base member joining a first arm member and a second arm member, said first arm member and said second arm member supporting said wheel support platform, wherein said subframe is attached to said frame; and
   a first bracket plate positioned adjacent the end of said first arm member opposite said base member, a second bracket plate positioned adjacent the end of said second arm member a opposite said base member, a first pin extending between said first bracket plate and said base member and a second pin extending between said second bracket plate and said base member, said first and second pins pivotably attaching said first clamping member and said second clamping member to said base member, and said first bracket plate and said second bracket plate, respectively.

2. A motorcycle dolly according to claim 1, wherein said frame and said subframe are interconnected using struts extending between said first leg member and said first arm member and between said second leg member and said second arm member, said struts being inclined so as to position said subframe vertically lower than said frame.

3. A motorcycle dolly according to claim 2, wherein said subframe is vertically positioned relative said frame to support said wheel support platform directly adjacent the work surface.

4. A motorcycle dolly according to claim 3, wherein said wheel support platform includes a plurality of support slats extending between said first arm member and said second arm member, and a grid plate attached to said support slats.

5. A motorcycle dolly according to claim 3, wherein each caster of said plurality of casters is positioned at a corner of said frame, and the end of said wheel support platform initially receiving the front wheel or the rear wheel is positioned inwardly from the casters positioned at the corners of said frame opposite said connecting member to inhibit tipping of the motorcycle dolly when either the front wheel or the rear wheel of the motorcycle dolly is received thereon.

6. A motorcycle dolly according to claim 3, wherein one of said casters is attached adjacent the end of said first leg member opposite said connecting member and one of said casters is attached adjacent the end of said second leg member opposite said connecting member, said wheel support platform positioned inwardly relative said casters on the ends of said first leg member and said second leg member to inhibit tipping of the motorcycle dolly when either the front wheel or the rear wheel of the motorcycle is initially received thereon.

7. A motorcycle dolly according to claim 1, wherein said second portions of said first clamping member and said second clamping member each include a horizontal straight rail and a horizontally-oriented J-shaped rail, and said first portions each include a vertical straight rail and a vertically-oriented J-shaped rail, wherein said pins extend through said horizontal straight rails of both said first clamping member and said second clamping member.

8. A motorcycle dolly according to claim 1, further comprising a first bracket extending outwardly from said first clamping, member toward said connecting member, a second bracket extending outwardly from said second clamping member toward said connecting member, tilt adjusters provided through the ends of said brackets adjacent said connecting member, and at least one lip attached along said connecting member, said tilt adjusters contacting said at least one lip, and being adjustable inwardly and outwardly relative to the ends of said bracket to selectively change the pivotal position of said first clamping member and said second clamping member.

9. A motorcycle dolly for supporting either a front wheel or a rear wheel of a motorcycle or other similar two-wheeled vehicle on a work surface, the motorcycle dolly comprising:
- a frame having a connecting member joining a first leg member and a second leg member, said first leg member and said second leg member defining a space therebetween;
- a wheel support surface for selectively receiving one of the front wheel and the rear wheel thereon;
- a subframe attached to said frame for carrying said wheel support surface relative to said frame;
- a plurality of casters attached to said frame for supporting the motorcycle dolly on the work surface;
- a first clamping member and a second clamping member pivotably attached relative to said frame, said first clamping member and said second clamping member each having an upwardly extending first portion and a second portion aligned with at least one of said first leg member and said second leg member, said first portion and said second portion disposed at an angle relative to one another, wherein said first clamping member and said second clamping member are selectively pivotal with respect to said frame to clamp either the front wheel or the rear wheel received therebetween; and
- a first pin associated with said first clamping member and a second pin associated with said second clamping member, said first clamping member pivotable about said first pin and said second clamping member pivotable about said second pin, wherein each of said first pin and said second pin are selectively positionable relative to said frame in one of at least two positions to define at least first and second positions for each of said first clamping member and said second clamping member relative to either the front wheel or the rear wheel received on said wheel support surface.

10. A motorcycle dolly according to claim 9, wherein, when said first clamping member and said second clamping member are in said first positions, said first clamping member and said second clamping member are spaced a first distance apart from one another, and, when said first clamping member and said second clamping member are in said second positions, said first clamping member and said second clamping member a spaced a second distance greater than said first distance apart from one another.

11. A motorcycle doily according to claim 9, further comprising a first plate associated with said first clamping member and a second plate associated with said second clamping member, said first pin being connected to said first plate and said second pin being connected to said second plate, wherein said first plate and said second plate are each selectively positionable relative to said frame.

12. A motorcycle dolly according to claim 9, wherein said first pin defines a first pivot axis associated with said first clamping member and said second pin defines a second pivot axis associated with said second clamping member.

13. A motorcycle dolly according to claim 12, wherein said first pivot axis is aligned with said second portion of said first clamping member and said second pivot axis is aligned with said second portion of said second clamping member.

14. A motorcycle doily according to claim 9, wherein said wheel support platform is carried by said subframe vertically lower than said frame within said space between said first leg member and said second leg member.

15. A motorcycle dolly according to claim 14, further comprising struts attaching said subframe to said frame, wherein at least one strut extends between said first leg member and said subframe and at least one strut extends between said second leg member and said subframe.

16. A motorcycle dolly according to claim 9, wherein said first clamping member and said second clamping member clamp either the front wheel or the rear wheel received therebetween by positioning at least one of said first portion and said second portion of each of said first clamping member and said second clamping member in contact with either the front wheel or the rear wheel.

17. A motorcycle dolly according to claim 9, wherein each caster of said plurality of casters is positioned at a corner of said frame, and the end of said wheel support platform initially receiving the front wheel or the rear wheel is positioned inwardly from the casters positioned at the corners of said frame opposite said connecting member to inhibit tipping of the motorcycle dolly when either the front wheel or the rear wheel of the motorcycle dolly is received thereon.

18. A motorcycle dolly according to claim 9, wherein one of said casters is attached adjacent the end of said first leg member opposite said connecting member and one of said casters is attached adjacent the end of said second leg member opposite said connecting member, said wheel support platform positioned inwardly relative said casters on the ends of said first leg member and said second leg member to inhibit tipping of the motorcycle dolly when either the front wheel or the rear wheel of the motorcycle is initially received thereon.

19. A motorcycle dolly according to claim 9, further comprising a first tilt adjuster associated with said first clamping member and a second tilt adjuster associated with said second clamping member, said first tilt adjuster and said second tilt adjuster being adjustable to selectively change the pivotal position of said first clamping member and said second clamping member.

20. A motorcycle dolly for supporting either a front wheel or a rear wheel of a motorcycle or other similar two-wheeled vehicle on a work surface, the motorcycle dolly comprising:
- a frame;
- a wheel support surface supported relative to said frame for selectively receiving one of the front wheel and the rear wheel thereon;
- a first clamping member and a second clamping member pivotably attached relative to said frame, said first clamping member and said second clamping member being selectively pivotal with respect to said frame to clamp either the front wheel or the rear wheel received therebetween;
- a first plate associated with said first clamping member and a second plate associated with said second clamping member, said first clamping member pivotable about a first pivot axis extending through said first plate and said second clamping member pivotable about a second pivot axis extending through said second plate, wherein said first plate and said second plate are each selectively positionable relative to said frame in one of at least two positions to define at least first and second positions for each of said first pivot axis and said second pivot axis; and a first tilt adjuster associated with said first clamping member and a second tilt adjuster associated with said second clamping member, said first tilt adjustor and said second tilt adjuster being adjustable to selectively change the pivotal position of said first clamping member and said second clamping member.

* * * * *

UNITED STATES PATENT AND TRADEMARK OFFICE
CERTIFICATE OF CORRECTION

PATENT NO. : 7,325,816 B2 Page 1 of 1
APPLICATION NO. : 11/147939
DATED : February 5, 2008
INVENTOR(S) : Charles Richard Johnson It is certified that error appears in the above-identified patent and that said Letters Patent is hereby corrected as shown below:

Column 8:
Line 22: change "member a opposite" to --member opposite--.

Column 9:
Line 6: change "clamplng, member" to --clamping member--;
Line 58: change "member a spaced" to --member are spaced--; and
Line 60: change "doily" to --dolly--.

Column 10:
Line 10: change "doily" to --dolly--.

Column 12:
Line 3: change "adjustor" to --adjuster--.

Signed and Sealed this

Sixth Day of May, 2008

JON W. DUDAS
*Director of the United States Patent and Trademark Office*